(12) United States Patent
Knowlson et al.

(10) Patent No.: US 8,499,090 B2
(45) Date of Patent: Jul. 30, 2013

(54) HYBRID METHOD FOR DELIVERING STREAMING MEDIA WITHIN THE HOME

(75) Inventors: Kenneth L. Knowlson, Lake Owsego, OR (US); Gamil A. Cain, EL Dorado Hills, CA (US); Ajit P. Joshi, Portland, OR (US); Jason Hongfeng Wang, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 12/317,840

(22) Filed: Dec. 30, 2008

(65) Prior Publication Data

US 2010/0169502 A1 Jul. 1, 2010

(51) Int. Cl.
*G06F 15/16* (2006.01)

(52) U.S. Cl.
USPC ............................ 709/231; 709/232; 709/233

(58) Field of Classification Search
USPC .......................................................... 709/231
See application file for complete search history.

(56) References Cited

U.S. PATENT DOCUMENTS

| | | | | |
|---|---|---|---|---|
| 5,675,390 A | * | 10/1997 | Schindler et al. | 715/717 |
| 5,790,176 A | * | 8/1998 | Craig | 725/115 |
| 6,457,052 B1 | * | 9/2002 | Markowitz et al. | 709/225 |
| 6,701,528 B1 | | 3/2004 | Arsenault | |
| 7,313,593 B1 | * | 12/2007 | Pulito et al. | 709/204 |
| 7,548,948 B2 | * | 6/2009 | Klemets et al. | 709/203 |
| 7,849,016 B2 | * | 12/2010 | So | 705/59 |
| 2002/0133830 A1 | | 9/2002 | Kim | |
| 2004/0003051 A1 | | 1/2004 | Krzyzanowski et al. | |
| 2004/0128343 A1 | | 7/2004 | Mayer | |
| 2006/0020982 A1 | * | 1/2006 | Jerding et al. | 725/89 |
| 2006/0206565 A1 | | 9/2006 | Ganesan | |
| 2006/0230142 A1 | | 10/2006 | Yamamoto et al. | |
| 2009/0055471 A1 | * | 2/2009 | Kozat et al. | 709/203 |
| 2009/0094317 A1 | * | 4/2009 | Venkitaraman | 709/203 |
| 2009/0125634 A1 | * | 5/2009 | Virdi et al. | 709/231 |
| 2010/0082831 A1 | * | 4/2010 | Hans | 709/231 |
| 2010/0169502 A1 | * | 7/2010 | Knowlson et al. | 709/231 |

FOREIGN PATENT DOCUMENTS

| | | |
|---|---|---|
| CN | 1614953 A | 5/2005 |
| CN | 1679019 A | 10/2005 |
| CN | 101778026 A | 7/2010 |
| EP | 2204966 A1 | 7/2010 |
| JP | 2000510622 A | 8/2000 |
| JP | 2006101217 A | 4/2006 |

(Continued)

OTHER PUBLICATIONS

European Office Action for Patent Application No. 09252837.1, dated Jun. 25, 2010 5 pages.

(Continued)

*Primary Examiner* — Brian P Whipple
*Assistant Examiner* — Keyvan Emdadi
(74) *Attorney, Agent, or Firm* — Barnes & Thornburg LLP

(57) ABSTRACT

A hybrid system and method for delivering "streaming" media within the home. According to the method, small portions of media items from a controlling device are received at a rendering device for pre-caching into a cache. Upon a user selecting a media item for playback, play of the media item is immediately started from the cache in real-time while the remaining portions of the selected media item are downloaded from the controlling device and appended to cache at a rate faster than real-time.

23 Claims, 7 Drawing Sheets

FOREIGN PATENT DOCUMENTS

| | | |
|---|---|---|
| JP | 2006314075 A | 11/2006 |
| JP | 2008288667 A | 11/2008 |
| WO | 9741504 A1 | 6/1997 |

OTHER PUBLICATIONS

European Search report received for European Patent Application No. 09252837.1 mailed on May 7, 2010, 3 pages.

Office action received for Korean Patent Application No. 20090131215 mailed on Feb. 7, 2011, 2 pages of english translation only.

Office Action received for Chinese Patent App. No. 200910262563.7, mailed Apr. 23, 2012, 5 pages of Chinese Office Action and 6 page of unofficial English translation.

Office Action received for Japanese Patent App. No. 2009-288054, mailed May 8, 2012, 2 pages of Japanese Office Action and 2 pages of unofficial English summary of Office Action.

Office Action received for Chinese Patent Application No. 200910262563.7, mailed Jan. 24, 2013, 7 pages of Chinese Office Action and 8 pages of unofficial English translation.

Decision for Grant received for Japanese Patent Application No. 2009-288054, mailed Jan. 15, 2013, 1 page of Japanese Decision for Grant and 1 page of unofficial, partial English translation.

Official Communication received for European Patent Application No. 09252837.1, mailed May 2, 2013, 6 pages.

* cited by examiner

HYBRID METHOD FOR DELIVERING STREAMING MEDIA WITHIN THE HOME

BACKGROUND OF THE INVENTION

1. Field of the Invention

The present invention is generally related to digital home media streaming. More particularly, the present invention is related to a hybrid method for delivering "streaming" media within the home.

2. Description

Traditional streaming methods are currently used for distributing media within the home via a home network today. These methods are challenged by issues such as, but not limited to, insufficient network bandwidth, non-reliable wireless links like 802.11 or HPAV (Home Powerline Audio/Video), congestion on the home network, etc. Also, the media being delivered today is moving from standard definition (SD) resolution to high definition (HD) resolution, further adding to the challenge. These issues can often result in a poor user experience. The desired user experience when playing media via the home network is to have the media start up immediately when selected and play with TV-like qualities, that is, without glitches, pauses, freeze frames, etc.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
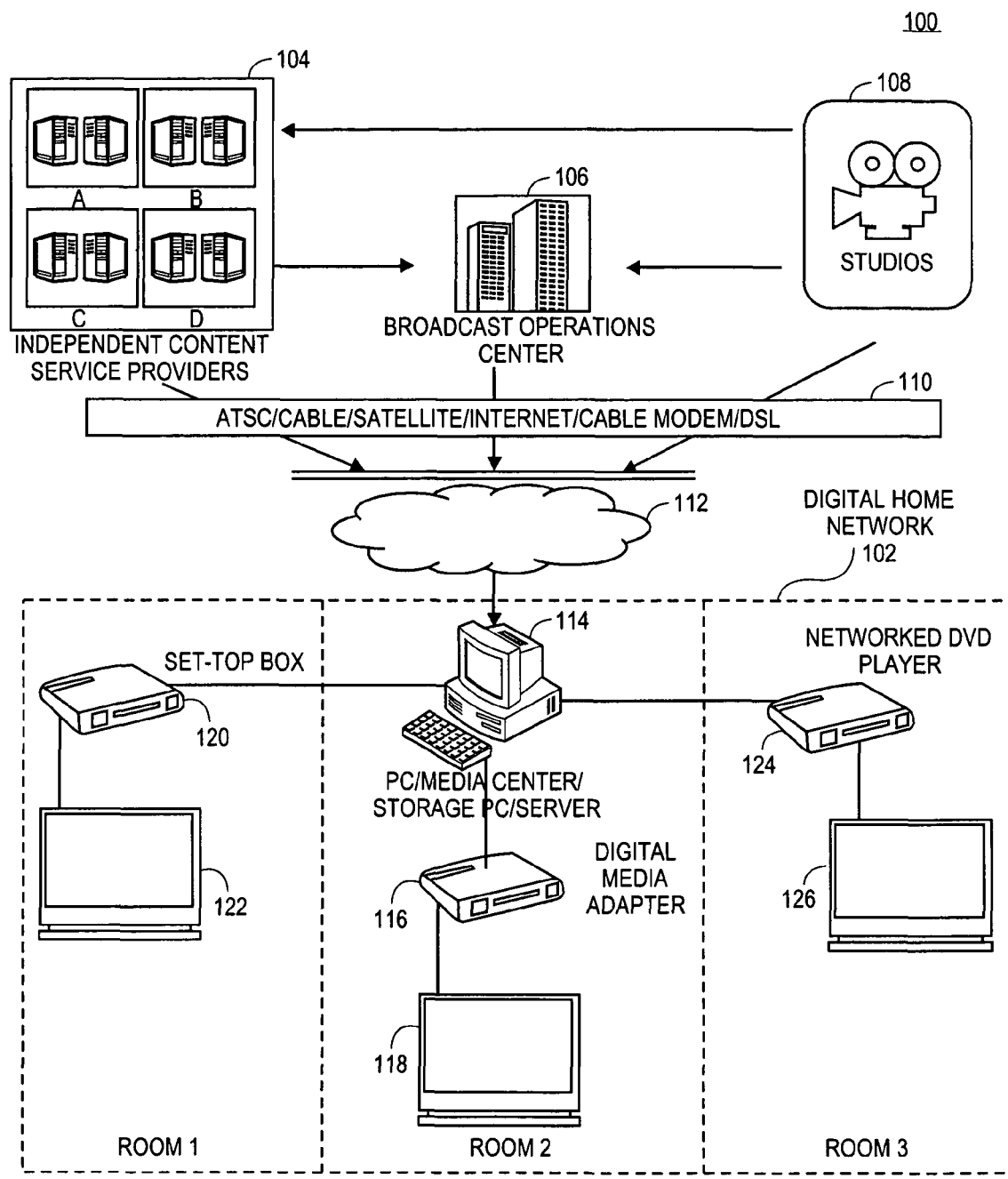
FIG. 1 is a diagram illustrating an exemplary home network system in which the present invention may be implemented according to an embodiment of the present invention.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Traditional streaming occurs in real-time. When delivering media within the home using the traditional streaming process, a user will browse a media list from the home media server and select an item to play. The media server, upon receiving the selection, will begin streaming the media selection to be rendered at the user's rendering device in real-time.

During a traditional streaming process, any variation in the effective network throughput can negatively impact the user's viewing experience. Typically, device side buffering is used to mitigate some of these impacts, but the amount of buffering a device can reasonably do today is on the order of a few seconds. On the other hand, when device side buffering increases, latency increases. In other words, the user has to wait longer to view the content. This too can negatively impact a user's viewing experience. Therefore, any jitter or latency beyond this limited buffer will be seen/experienced by the end user. Also, network based trick modes, such as, fast forward, rewind, etc., are very difficult to deliver at high quality when performing traditional streaming.

The duration of the streaming process is as long as the media item, so one is at the whim of the network conditions for the duration, which in the case of movies could be 90 to 120 minutes or more. The length of time required to stream "real-time" also increases the opportunity for high resource demanding applications at the PC, such as, for example, playing video games, surfing the web, printing large documents, to also cause degradation, stalls, etc. in the streaming experience.

Embodiments of the present invention are directed to a hybrid system and method for delivering "streaming" media within the home. This is accomplished by caching the first several minutes of media files at client devices that have some amount of storage to significantly improve the user playback experience over traditional streaming approaches. When the user selects the media file for viewing, the media file will immediately begin to play from the cache while the remaining portions of the media file are streamed into the cache. With the client device having the ability to store the media file, the remaining portions of the media file may be streamed faster than real-time whenever the network has the capacity to do so. Caching the first several minutes of a media file allows the user to experience the same instant playback experience as the user would get when playing locally stored media files. The user no longer needs to wait for the connection to the media server to be established or for sufficient content to be buffered before playback begins.

Although embodiments of the present invention are described using a home network, the invention is not limited to a home environment. In fact, one skilled in the art(s) would know that the invention may be applied to other environment in which a dedicated media server for the environment streams media to various entities/locations within the environment. Such environments may include an office environment, a school environment, a recreational environment, or any other environment in which users within the environment would request media items from the dedicated media server.

FIG. 1 is a diagram illustrating an exemplary home network system in which the present invention may be implemented according to an embodiment of the present invention. Home network system 100 may include a digital home network 102 that receives multimedia content over a wide area network (WAN) 112 from content providers, such as, but not limited to, independent content service providers 104 (A, B, C, and D), broadcast operations centers 106, and studios 108. In one embodiment, independent content service providers 104 and studios 108 may send their content to broadcast operations centers 106 to format the content and distribute the content to digital home network 102. Studios 108 may also send their content to independent content service providers 104 for formatting and distributing the content to digital home network 102 as well. The content may be provided to digital home network 102 using one or more systems 110, such as, but not limited to, a cable system using a coaxial cable connection, a satellite system using a satellite connection, an Internet service using a dial-in connection, a digital telephone connection such as DSL (Digital Subscriber Line), a high speed cable modem, etc., and an ATSC (Advanced Television Systems Committee) system using a high definition (HD) connection. The ATSC/Cable/Satellite/Internet systems 110 obtain information from independent content providers 104, broadcast operations centers 106, and studios 108 to enable audio/video information to be transferred to digital home network 102. Alternatively, content may be broadcast over the air to digital home network 102 from independent content service providers 104, broadcast operations centers 106 and studios 108.

Digital home network 102 uses a controlling device 114 to extend digital multimedia content and information received from independent content service providers 104, broadcast operations centers 106, and studios 108 throughout the home using wired and/or wireless technology. Controlling device 114 may include, but is not limited to, a personal computer (PC), a media center, a storage PC, a workstation, a media server, a combination thereof, or any other computing device capable of storing and streaming media content. Controlling device 114 may store content distributed by independent content service providers 104, broadcast operations centers 106, and studios 108. Controlling device 114 may distribute the content in an appropriate manner to any one or more rendering devices in the home. This will be described in detail below with reference to FIGS. 2, 3, 4, and 5. Digital home network 102 may be coupled to WAN 112 via a connection (not shown), such as, a dial-in connection, a high speed cable modem connection, a digital subscriber line (DSL) connection, a satellite connection, a HD connection, or any other means capable of connecting digital home network 102 to WAN 112.

Digital home network 102 includes a plurality of rendering devices in which the media content may be distributed, via controlling device 114, throughout the home for remote viewing of media content (instead of only viewing the media content on controlling device 114). The rendering devices may be distributed throughout the home in numerous ways.

For simplicity, FIG. 1 describes three different exemplary rendering device scenarios, each rendering device scenario located in a different room of the home. In room 1, the rendering device includes a set-top box 120 connected to a first television monitor 122. Set-top box 120 connects to first television monitor 122 and controlling device 114 to enable signals from controlling device 114 to be turned into content for displaying on first television monitor 122.

In room 2, the rendering device includes a digital media adaptor 116 coupled to a second television monitor 118. Digital media adaptor 116 enables electrical connections between devices not ordinarily intended for use together. For example, digital media adaptor 116 electrically connects controlling device 114 to television monitor 118. Television monitor 118 utilizes digital media adaptor 116 in order to receive audio/video input that it would otherwise be unable to receive directly from controlling device 114. Room 2 is also shown as housing controlling device 114. Although FIG. 1 shows controlling device 114 as being located in room 2, controlling device may be located in any of rooms 1, 2, or 3, or elsewhere within the home.

In room 3, the rendering device includes a networked DVD (Digital Video Disc) player 124 coupled to a third television monitor 126. Networked DVD player 124 is connected to third television monitor 126 and controlling device 114 to enable any content received from controlling device 114 to be displayed on third television monitor 126. Networked DVD player 124 may also be used to store video and other data in an optical format.

Controlling device 114 may be a dedicated device, such as a media server, or may be a device that supports many simultaneous usages. For example, controlling device 114 may act as a media server in which media content stored on controlling device 114 may be served up to rendering devices in digital home network 102, such as, for example, digital media adaptor 116, set-top box 120, and/or networked DVD player 124 for viewing on television monitors 118, 122, and/or 126, respectively. In some embodiments, the act of serving up media content may be occurring in the background. In the foreground, other activities may be occurring. For example, controlling device 114 may act as a personal computer for enabling a user to perform a variety of operations, such as, for example, playing a video game, performing searches on the Internet, downloading other content using the bandwidth on the home network, printing documents, executing other applications, etc. The simultaneous usages of controlling device 114 that require controlling device 114 to act as a PC as well as a media server may occur asynchronously, and therefore, may interfere with controlling device 114 being able to provide a high quality streaming media experience. For example, controlling device 114 may be reading media data from storage for streaming media to one of media rendering devices 116, 120, and 124, and at the same time a printer, connected to controlling device 114, may be reading data off of the disc for printing. This simultaneous use of controlling device 114 may cause controlling device 114 to run slower, and in many instances to stop responding for a while with one or more of the simultaneous applications that are executing. The streaming media application might be one of the applications in which controlling device 114 stops responding for a while, and therefore may not be able to serve any media contents for a period of time, such as, for example, a few minutes, due to process interference or network congestion. Other sources of interference may include signals from other wireless networks in the area, including but not limited to cell phone networks, and other electronic devices operating in close proximity to the controlling device, such as for example, a microwave oven, that may reduce overall throughput.

Digital media adaptor 116, set-top box 120, and networked DVD player 124 may receive media content being served up from controlling device 114 as a live media stream. In one embodiment, digital media adaptor 116, set-top box 120, and networked DVD player 124 are shown to directly connect to controlling device 114 via a network connection. The network connection may be a wired connection, such as, for example, an Ethernet connection, or it may be a wireless connection, such as, but not limited to, WiFi, WiMAX, UWB, etc.

In one embodiment, controlling device 114 may also receive digital multimedia data from other digital devices (not shown), such as, but not limited to, an MP3 player, a digital camcorder, a digital camera, and any other electronic devices that may provide multimedia data to controlling device 114. The digital multimedia data received from these digital devices may be rendered on one or more of rendering devices 116, 120, and 124 via controlling device 114.

Embodiments of the present invention take advantage of the fact that large amounts of storage at economical prices are now being installed in rendering devices/endpoints. The rendering devices may be partitioned in a manner that allows one portion of the storage device to act as a cache. Embodiments of the present invention offload the home network by leveraging an amount of this storage or cache at the rendering devices/endpoints. Rendering devices are not required to replicate all of the content on the network to get this benefit. Only the first few minutes of large media items are pre-cached at the rendering device.

Figure 2:
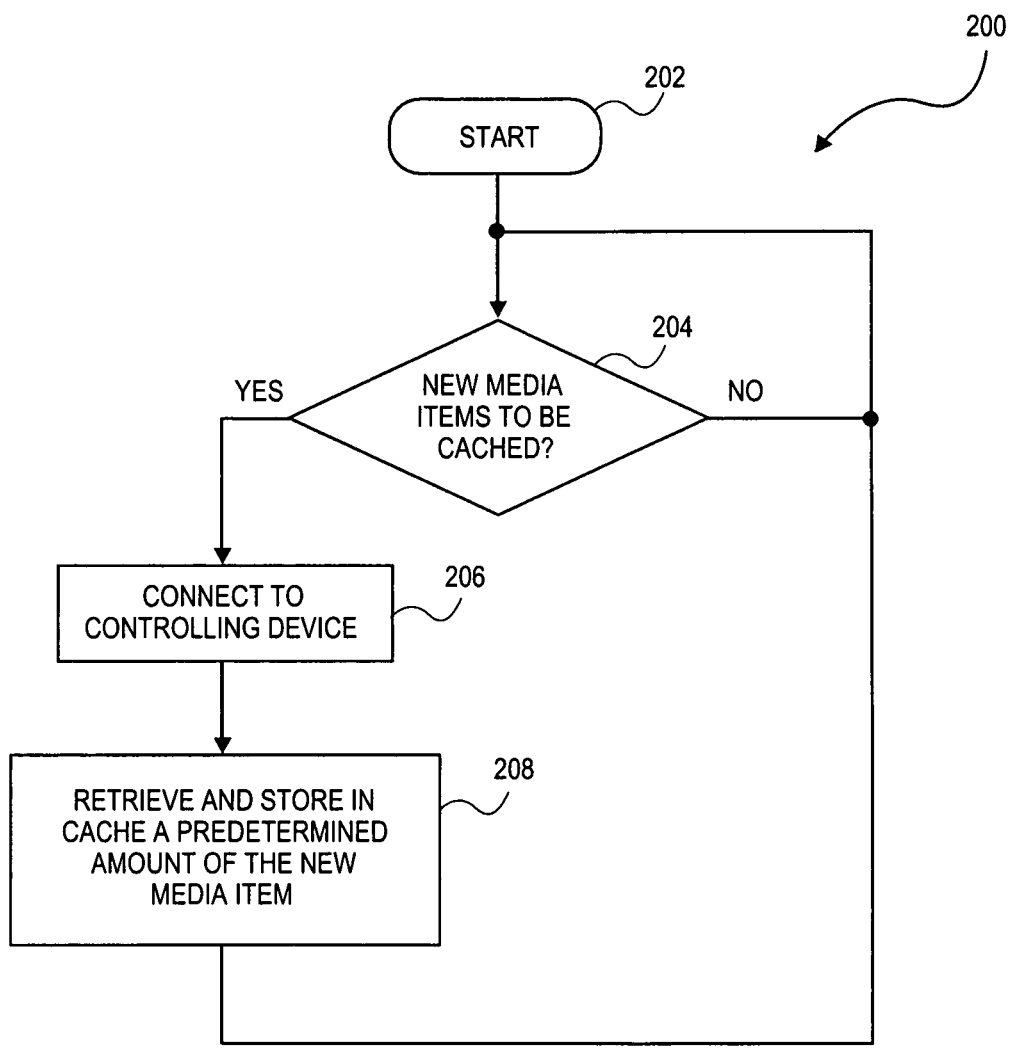
FIG. 2 is a flow diagram describing a method for caching the first few minutes of large media items in a cache of a rendering device/endpoint according to embodiments of the present invention.

FIG. 2 is a flow diagram 200 describing a method for caching the first few minutes of large media items in the cache of a rendering device/endpoint according to embodiments of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins at block 202, where the process immediately proceeds to decision block 204.

In decision block 204, it is determined whether there is media content stored on controlling device 114 that should be partially cached on the rendering device. This may be done using several different mechanisms. For example, intelligent prediction based on past usage and recently acquired media content may be used to determine the media content that needs to be partially pre-cached on the rendering device. For example, if a user has purchased a media item recently, such as, for example, a movie, that item might be pre-cached to the networked device most used by that user. Another example may be to provide a simple user interface at the rendering device to enable the user to select and rate items on controlling device 114 that they would like to watch at the rendering device in the near future. For example, an application may be executed that provides a profile of the user, indicating the user's likes and dislikes based on the selection and rating of items on the home server. The items most likely to be viewed by the user will be pre-cached on the rendering device most watched by the user. Embodiments of the present invention are not limited to these examples. In fact, other mechanisms for determining which media content to partially pre-cache on the rendering device may also be used. If it is determined that there are media content to be partially pre-cached on the rendering device in question, then the process proceeds to block 206.

In block 206, control device 114 is connected to the rendering device. The process then proceeds to block 208.

In block 208, media content determined to be of interest to the users of the rendering device is retrieved and partially sent to the rendering device, where it is partially pre-cached on the rendering device. The process then proceeds back to block 204 to determine whether additional media content from controlling device 114 needs to be partially cached on the rendering device.

Returning to block 204, if it is determined that there is no media content to be partially pre-cached, the process remains at block 204.

Figure 3:
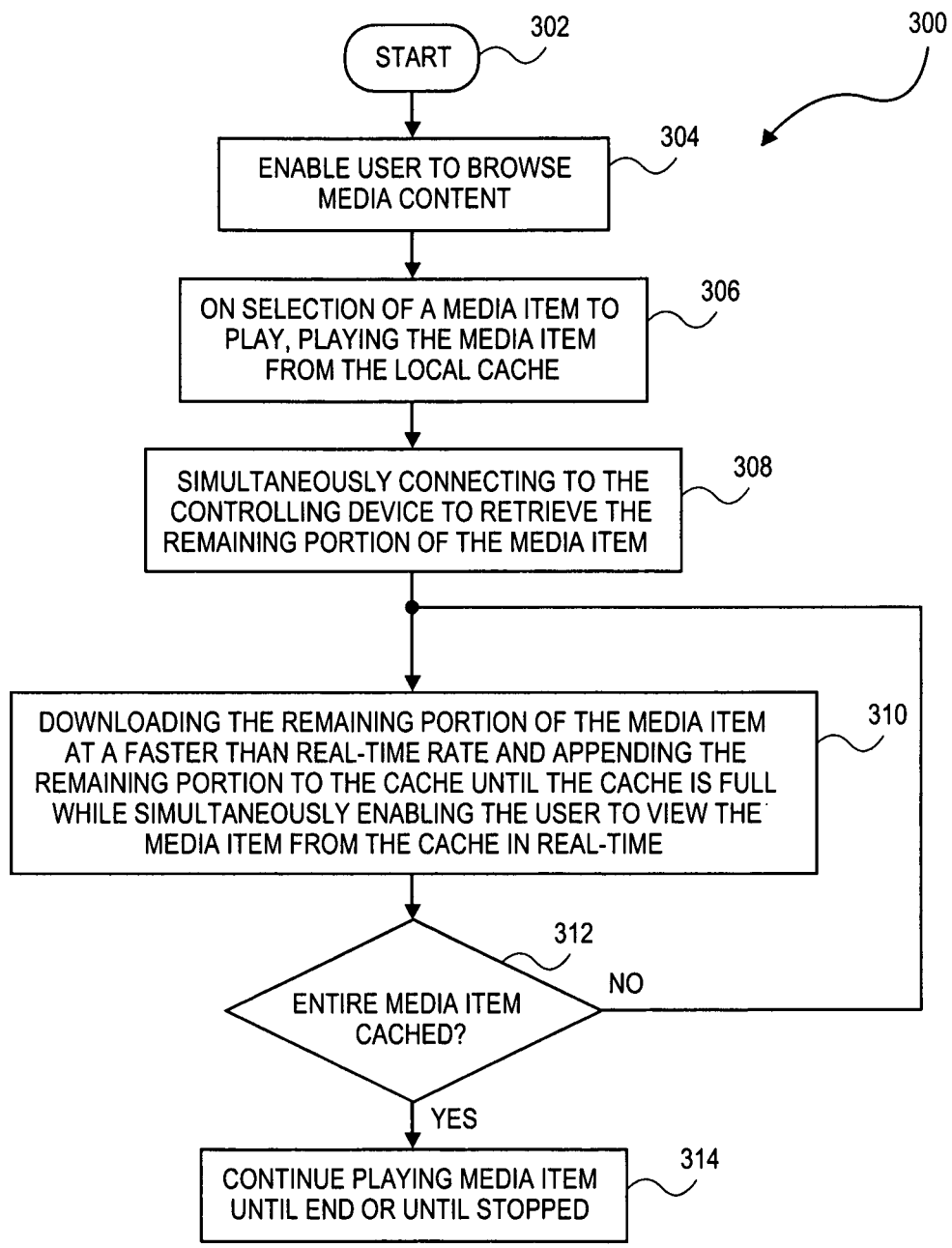
FIG. 3 is a flow diagram describing a hybrid method for delivering "streaming" media to a rendering device within a home according to an embodiment of the present invention.

Once the cache on a rendering device has been established, a user may select an item for playback. FIG. 3 is a flow diagram 300 describing a hybrid method for delivering "streaming" media to a rendering device within the home according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, the rendering device enables a user to browse media content at controlling device 114. The process then proceeds to block 306.

In block 306, on the selection of an item to play by the user, the rendering device begins play of the media item from the local cache. Pre-caching a pre-determined amount of the selected media item into the local cache of the rendering device enables playback to start instantly at the rendering device, thus, removing the network/controlling device 114 latency of requesting media playback and the device induced latency of buffering, before play can begin. Pre-caching also absorbs relatively long periods of network instability and still yields a very good user experience, absorbs network jitter, and provides a playback experience on par with any playback experience from a consumer electric device having a disc, including all of the benefits of local (vs. networked) trick modes. The process immediately proceeds to block 308.

In block 308, when the rendering device begins to play the selected media item, this act triggers the rendering device to connect to the same media item on controlling device 114 from which the pre-cached content was received. The process then proceeds to block 310.

In block 310, the remaining media content for the selected media item is downloaded to the cache in a "hybrid streaming" manner. The media may be delivered to the cache of the rendering device at faster than real-time speeds. The rendering device requests the selected media content from controlling device 114 at an offset that corresponds to the end location of the media item in the cache. As the rendering device receives the media content from the media source on controlling device 114, the media content is appended to the corresponding file in the cache of the rendering device until the cache is full. The cache acts as a moving buffer, playing the media item from the local cache while continuously filling the cache with the remaining portions of the media item. In one embodiment, once a media item is selected for playback, the available cache size limit may be significantly increased from a few minutes. It may in fact, if the device has the storage space, be expanded to include the entire size of the selected media item. The process then proceeds to decision block 312.

Note that even though a pre-determined amount of the media item is to be kept in the cache of the rendering device, there may be times when one or more events will occur at controlling device 114 that may slow or halt the streaming process for a few minutes that result in the cached content being reduced in size for a short period of time. Even though the amount of cached content may be reduced during these times, because the system supports streaming/downloading at faster than real-time, the system may catch up and refill the cache.

In decision block 312, it is determined whether the entire selected media item has been cached at the rendering device. If the entire selected media item has not been cached at the rendering device, the process proceeds back to block 310 to continue streaming the media item into the cache at greater than real-time speeds while the media item is being played in real-time.

Returning to decision block 312, if it is determined that the entire selected media item has been cached at the rendering device, the process proceeds to block 314. At block 314, the media item may continue to play in real-time until the media item ends or the user stops play of the media item.

The downloading process is referred to as "hybrid streaming" because the media content is streamed from the source faster than real-time to fill up the local cache of the rendering device while the rendering device plays the media item from the local cache in real-time. With streaming from the source being faster than real-time, several streaming methods may be used. For example, the media may be streamed using QoS (Quality of Service) packet tagging (i.e., tagging packets according to different priorities). In other embodiments of the present invention, best effort may be used in which packets tagged at a low priority or not tagged at all are automatically treated as low priority tagged packets. A best effort approach may be more network friendly to other networking activities going on in the home. In yet another embodiment, a combination of approaches may be used as well. For example, the process may start out using best effort, but switch to QoS if the user depletes the cache.

In another embodiment of the present invention, media content may be protected. In the case of protected content, the content is encrypted. Since the present invention requires pre-caching of a small portion of a media item on the rendering device prior to playing the media item, and then, at a later time when a user desires to play the media item, playing the media item from the cache while simultaneously appending the remaining content of the media item to the cache, the content that was pre-cached may have a different encryption key than the content being cached at the time of viewing. Although the pre-cached item and the remaining content may be encrypted using the same algorithm, the encryption keys may be different because of the lapse between pre-caching a small portion of the media item and caching the remaining portions of the media item for viewing.

Figure 4:
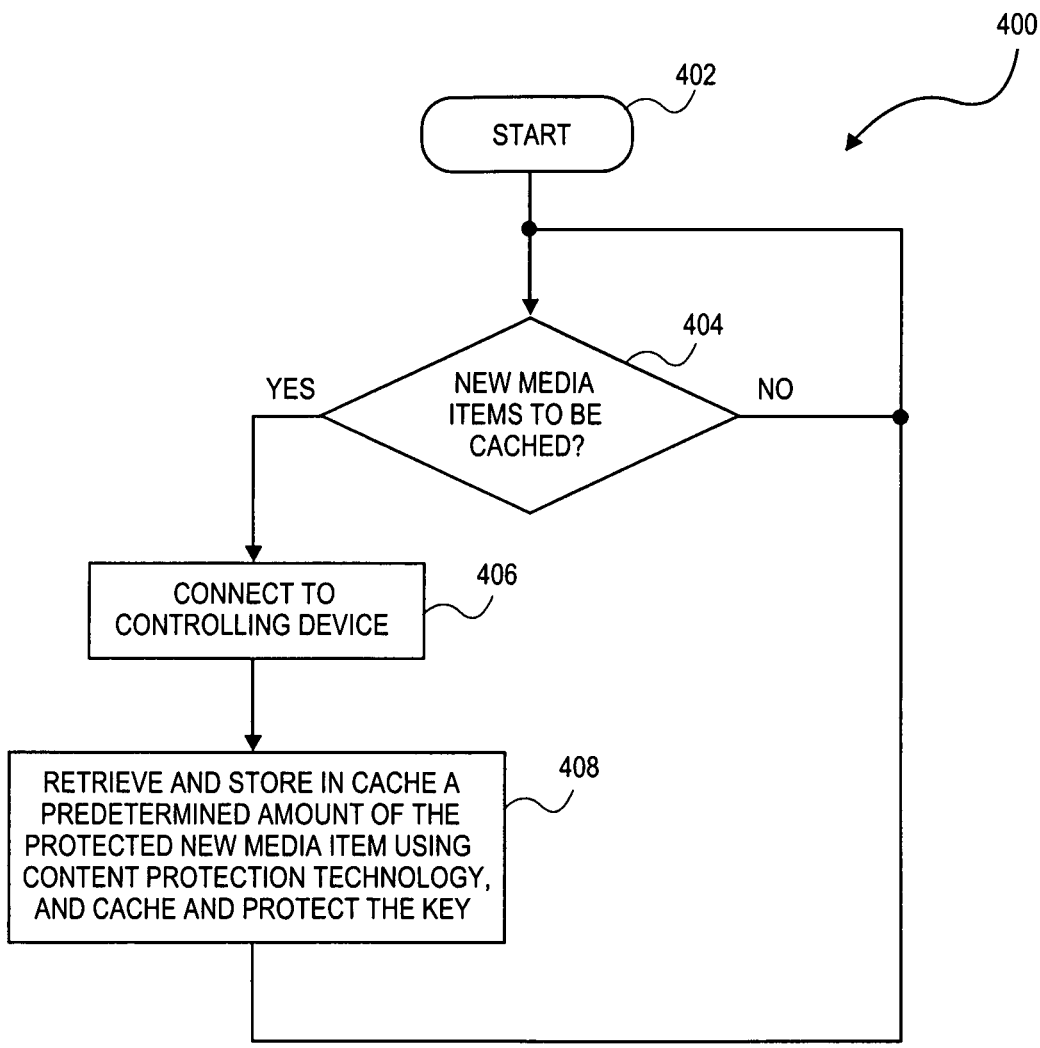
FIG. 4 is a flow diagram describing a method for caching the first few minutes of large protected media items in a cache of a rendering device/endpoint according to embodiments of the present invention.

FIG. 4 is a flow diagram 400 describing a method for caching the first few minutes of large protected media items in the cache of a rendering device/endpoint according to embodiments of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins at block 402, where the process immediately proceeds to decision block 404.

In decision block 404, it is determined whether there is media content stored on controlling device 114 that should be partially cached on the rendering device. This may be done using several different mechanisms as described above with respect to FIG. 2. If it is determined that there are media content to be partially pre-cached on the rendering device in question, then the process proceeds to block 406.

In block 406, control device 114 is connected to the rendering device. The process then proceeds to block 408.

In block 408, media content determined to be of interest to the users of the rendering device is retrieved and partially sent to the rendering device, where it is partially pre-cached on the rendering device. For protected content, the content must be delivered to the rendering device using some sort of content protection technology, such as, for example, using DTCP-IP (Digital Transmission Content Protection—Internet Protocol). Although DTCP-IP is given as an example, other content protection technology may be used as well. The resulting cached content must be stored in a protected manner on the rendering device. For example the cached content may be stored leveraging DTCP-IP, a proprietary (or standards based) encryption, or stored "in the clear" leveraging a protected storage infrastructure. Other protected storage options may also work as well. When the protected content is stored, a secure key exchange occurs. The key is also cached and protected so that the media content can be decrypted properly when the media content is selected for viewing. The process then proceeds back to block 404 to determine whether additional media content from controlling device 114 needs to be partially cached on the rendering device.

Returning to block 404, if it is determined that there is no media content to be partially pre-cached, the process remains at block 404.

Figure 5:
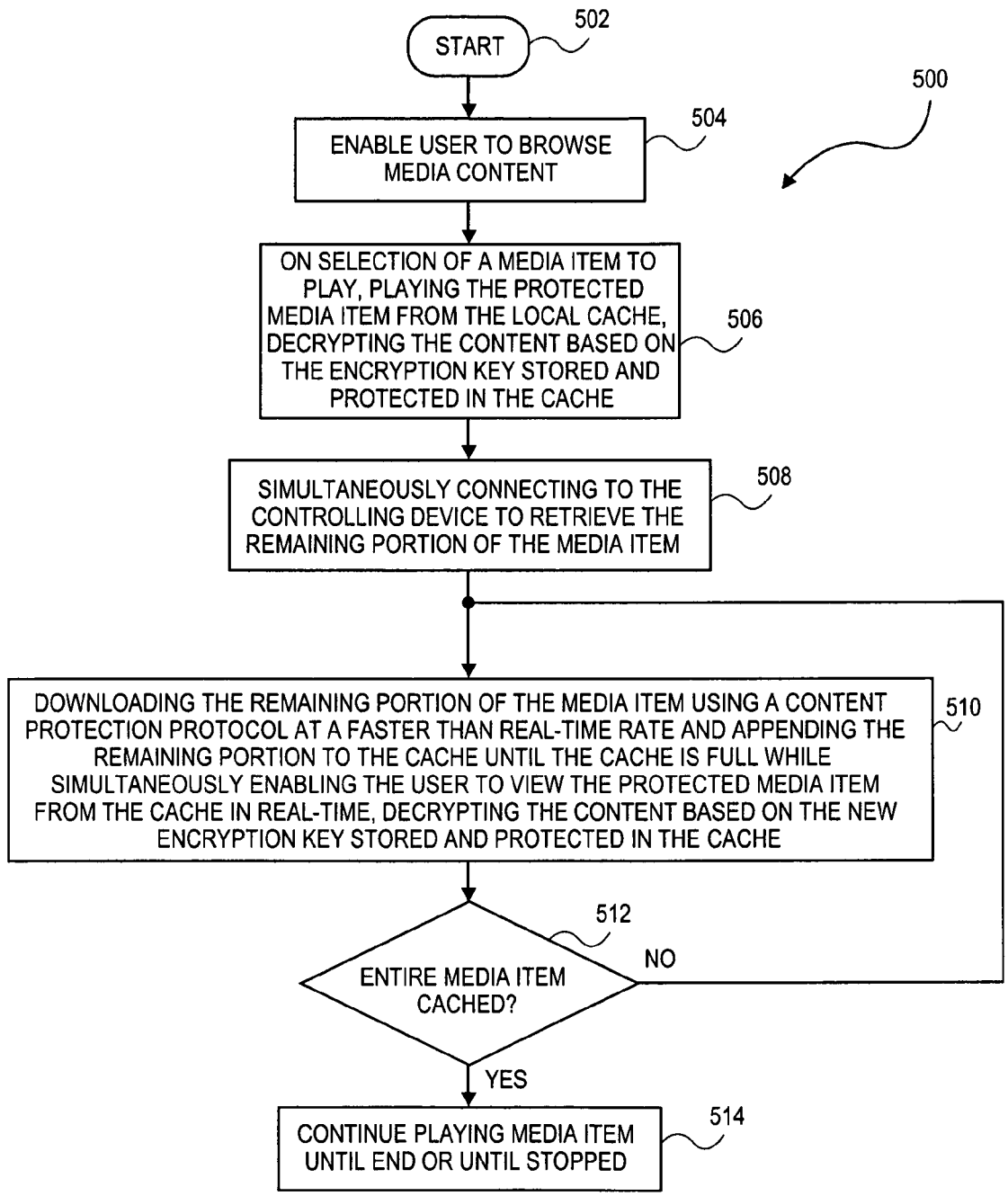
FIG. 5 is a flow diagram describing a hybrid method for delivering "streaming" media to a rendering device within a home for protected media content according to an embodiment of the present invention.

Once the cache on a rendering device has been established, a user may select a protected media item for playback. FIG. 5 is a flow diagram 500 describing a hybrid method for delivering "streaming" media to a rendering device within the home for protected media content according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins with block 502, where the process immediately proceeds to block 504.

In block 504, the rendering device enables a user to browse media content at controlling device 114. The process then proceeds to block 506.

In block 506, on the selection of an item to play by the user, the rendering device begins play of the protected media item from the local cache, decrypting the content based on the encryption key stored and protected in the cache. Pre-caching a pre-determined amount of the selected media item into the local cache of the rendering device enables playback to start instantly at the rendering device, thus, removing the network/controlling device 114 latency of requesting media playback that needs to be buffered before play can begin. Pre-caching also absorbs relatively long periods of network instability and still yields a very good user experience, absorbs network jitter, and provides a playback experience on par with any playback experience from a consumer electric device having a disc, including all of the benefits of local (vs. networked) trick modes. The process immediately proceeds to block 508.

In block 508, when the rendering device begins to play the selected media item, this act triggers the rendering device to connect to the same media item on controlling device 114 from which the pre-cached content was received. The process then proceeds to block 510.

In block 510, the remaining media content for the selected media item is downloaded to the cache using a content protection protocol, such as DTCP-IP, or some other content protection protocol, in a "hybrid streaming" manner as described above with reference to FIG. 3. The media may be delivered to the cache of the rendering device at faster than real-time speeds. The rendering device requests the selected media content from controlling device 114 at an offset that corresponds to the end location of the media item in the cache. As the rendering device receives the media content from the media source on controlling device 114, the media content is appended to the corresponding file in the cache of the rendering device until the cache is full. The received content may be encrypted as it is stored locally in the cache. The media content may be stored leveraging DTCP-IP, a proprietary (or standards based) encryption, stored "in the clear" leveraging a protected storage infrastructure, or stored in some other protected manner. When the remaining protected content is stored, a new secure key exchange occurs. This new key is also cached and protected so that the protected media content can be decrypted properly when the protected media content is viewed. Thus, at the end of play of the pre-cached content, the key used to decrypt the pre-cached content is no longer used. The new key used to store the protected media content currently being appended to the pre-cached portion of the cache is used to decrypt this protected media content when viewed by the user. This process of eliminating the use of the old key after the pre-cached media content is viewed and using the new key to decrypt the newly retrieved content occurs seamlessly. The cache acts as a moving buffer, playing the media item from the local cache while continuously filling the cache with the remaining portions of the media item. The process then proceeds to decision block 512.

In decision block 512, it is determined whether the entire selected media item has been cached at the rendering device. If the entire selected media item has not been cached at the rendering device, the process proceeds back to block 510 to continue streaming the media item into the cache at greater than real-time speeds while the media item is being played in real-time.

Returning to decision block 512, if it is determined that the entire selected media item has been cached at the rendering device, the process proceeds to block 514. At block 514, the media item may continue to play in real-time until the media item ends or the user stops play of the media item.

Figure 6:
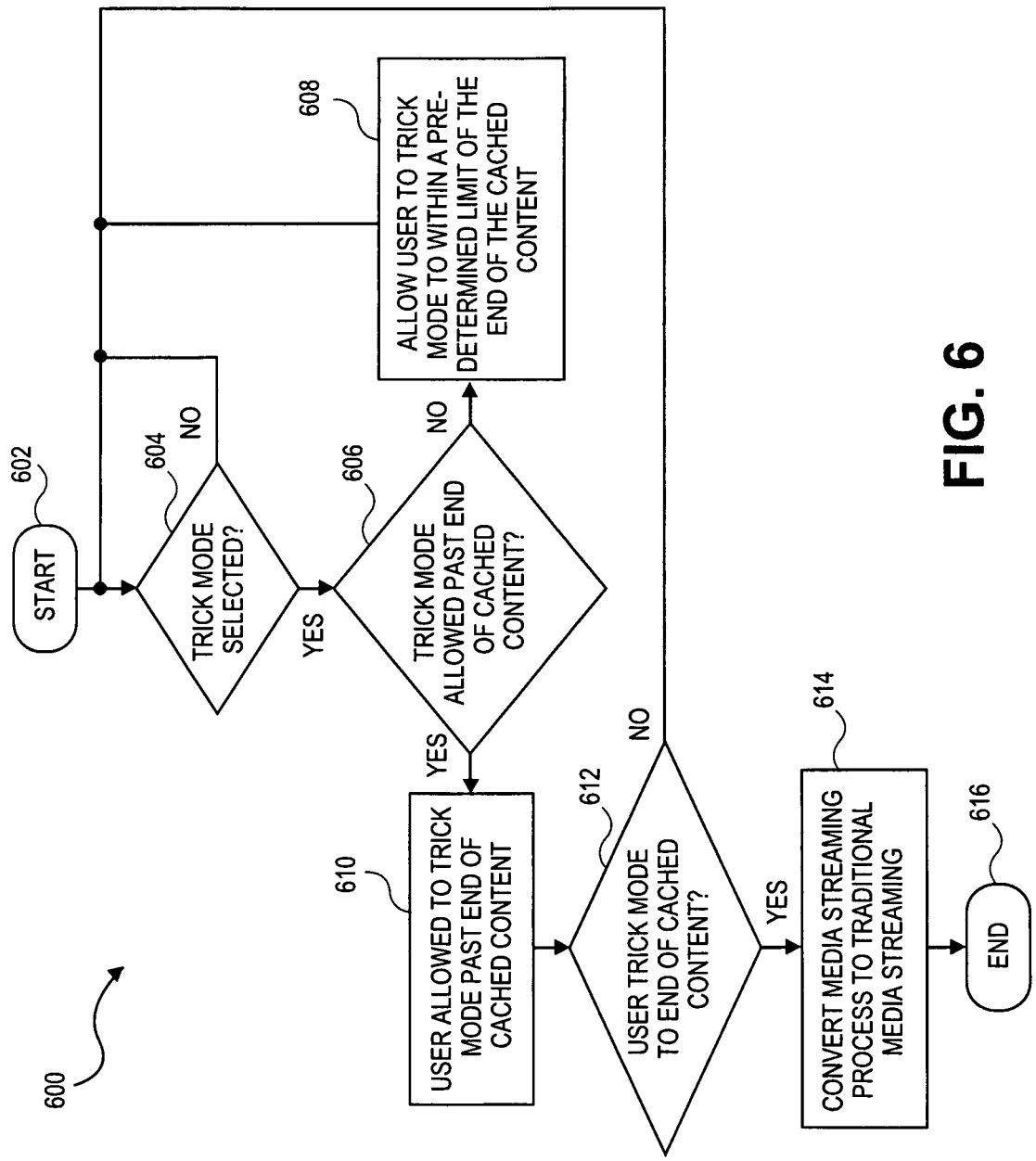
FIG. 6 is a flow diagram illustrating methods for enabling trick mode practices according to an embodiment of the present invention.

In embodiments of the present invention, trick modes may be used. FIG. 6 is a flow diagram 600 illustrating methods for enabling trick mode practices according to an embodiment of the present invention. The invention is not limited to the embodiment described herein with respect to flow diagram 600. Rather, it will be apparent to persons skilled in the relevant art(s) after reading the teachings provided herein that other functional flow diagrams are within the scope of the invention. In one embodiment a user is not allowed to trick mode past the end of the cached content. In one embodiment, a user may not be allowed to trick mode within one or two minutes of the end of the cached content. This is done to preserve a good playback experience. In yet another embodiment, a user may be allowed to trick mode past the end of the cached content, but at this point, the system will be placed into a legacy streaming mode in which traditional real-time streaming from control device 114 occurs. In this instance, the user will now experience some of the problems that the present invention seeks to eliminate, resulting in a less than good viewing experience for the user. The process begins in block 602, where the process immediately proceeds to decision block 604.

In decision block 604, it is determined whether trick mode play is selected. If trick mode play is not selected, the process remains at decision block 604 until trick mode play is selected. If trick mode play is selected, the process proceeds to decision block 606.

In decision block 606, it is determined whether trick mode play is allowed past the end of the cached content. If trick mode play is not allowed past the end of the cached content, the process proceeds to block 608.

In block 608, the user is allowed to trick mode to the end of the cached content. In one embodiment, the user is allowed to trick mode to within a pre-determined amount of time before the end of the cached content to preserve the good playback experience. In one embodiment, the pre-determined amount of time before the end of the cached content may be two minutes. In yet another embodiment, the pre-determined amount of time before the end of the cached content may be one minute. The process then proceeds back to decision block 604 to wait for the next trick mode selection.

Returning to decision block 606, if trick mode play is allowed past the end of the cached content, the process proceeds to block 610. In block 610, the user is allowed to trick mode past the end of the cached content. The process proceeds to decision block 612.

At decision block 612, it is determined whether the user performed a trick mode to the end of the cached content. If the user did not perform a trick mode to the end of the cached content, the process proceeds back to decision block 604 to wait for the next trick mode selection.

Returning to decision block 612, if it is determined that the user performed a trick mode to the end of the cached content, the process proceeds to block 614, where the media streaming process converts to traditional streaming such that play of the media item no longer comes from the cache, but comes directly from controlling device 114. The process proceeds to block 616, where the process ends.

In embodiments of the present invention, there is a pre-determined amount of the media item that must be cached to achieve the benefits of a good user viewing experience. The amount of the media item that must be cached to achieve this improvement may vary depending on the available network throughput. For example, if there is a very fast network available, the amount of content that needs to be cached may be reduced. In fact, no storage may be required because the network may stream much faster than playback.

Figure 7:
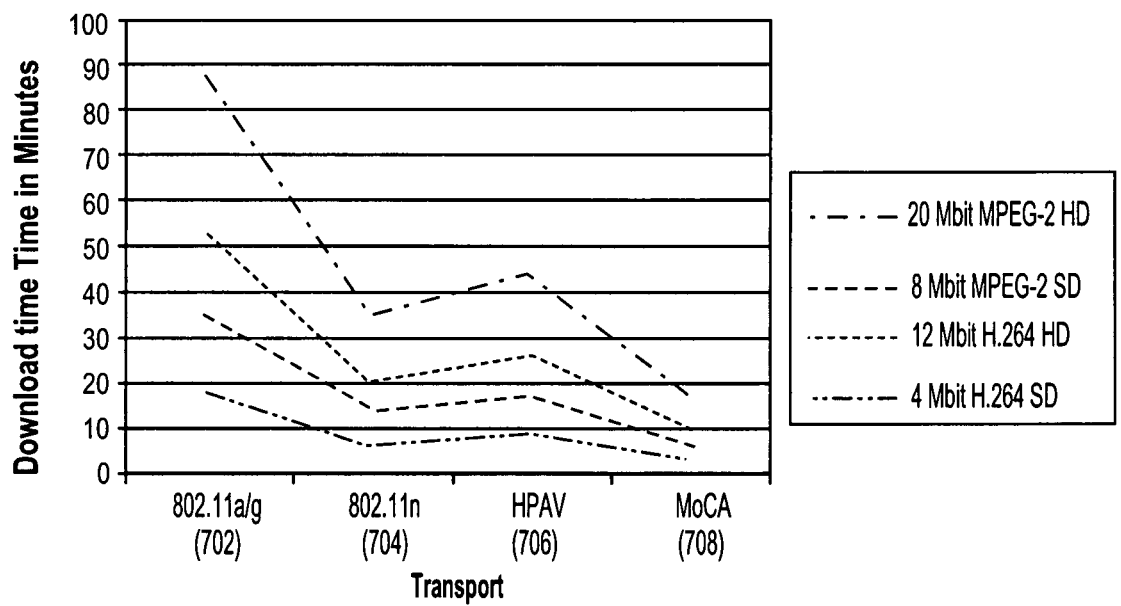
FIG. 7 is a diagram illustrating simulation results for the time it takes to download a 90 minute video using a hybrid streaming process of embodiments of the present invention over various network links.

Embodiments of the present invention enable a portion of a media item to be pre-cached on a rendering device prior to playing while the remaining portion of the media item is progressively downloaded to the cache while a user simultaneously views the media content from the cache. FIG. 7 is a diagram 700 illustrating simulation results for the time it takes to download a 90 minute video using the hybrid streaming process of embodiments of the present invention over various network links. The simulation assumes a ten (10) minute cache at the rendering device. The data points show the time needed to download different movies of different bitrates over four different network infrastructures: 802.11a/g (702), 802.11n (704), HPAV (706), and MoCA (Multimedia over Coax Alliance) (708). As shown in FIG. 7, the worst case is for 20 Mbit (Megabit) MPEG content over a single hop 802.11a/g network (702). In this instance, the results are not much better than traditional streaming. Thus, for high bit rate media items, the system may decide to implement a cache having the ability to house more content (larger than a 10-minute cache) in order to achieve a desired user experience. For other network infrastructures (704, 706, and 708), the process of hybrid streaming the media content by caching provides the content at a much faster rate than real-time, easily keeping ahead of user consumption even in the face of periods of several minutes of network throughput degradation (which was not simulated). Note that the simulation assumes 40 Mbit throughput for HPAV, 50 Mbit throughput for 802.11n (both at 50% coverage) and 100 Mbit throughput for MoCA (this only works where there are COAX drops).

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include at least one processor, a storage medium readable by the at least one processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hard-wired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, etc. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A home network system comprising:
    a controlling device having storage to store a plurality of multimedia items;
    a plurality of rendering devices coupled to the controlling device, each of the plurality of rendering devices are connected to a monitor and comprising storage, the storage of at least one of the rendering devices comprising a partitioned cache of a pre-determined length to (i) enable a portion of a protected multimedia item received from the controlling device using content protection technology to be pre-cached in a protected manner on the at least one rendering device prior to selection by a user for viewing, and (ii) pre-cache a first key obtained via a first key exchange in response to the portion of the protected multimedia item being pre-cached into the partitioned cache prior to selection by the user for viewing, the first key to decrypt the portion of the protected multimedia item pre-cached in the partitioned cache;
    wherein in response to the user selection of the protected multimedia item for viewing, the partitioned cache to expand and a remaining portion of the protected multimedia item to be progressively streamed from the controlling device to the cache at a rate faster than real-time while the monitor simultaneously displays the multimedia item from the cache; and
    wherein the partitioned cache further to store and protect a second key, the second key to decrypt the remaining portion of the protected multimedia item being progressively streamed from the controlling device.

2. The system of claim 1, wherein upon selection of the protected multimedia item by the user for viewing, the selected protected multimedia item to begin play of the pre-cached portion in real-time while the remaining portion of the selected protected multimedia item to be appended to the pre-cached portion of the selected protected multimedia item in the cache at the faster than real-time rate.

3. The system of claim 1, wherein intelligent prediction based on past usage and recently acquired media is used to determine multimedia items to be pre-cached on the rendering devices.

4. The system of claim 1, further comprising an interface at the rendering devices to enable users of the rendering devices to select and rate multimedia items stored on the controlling device, and based on the ratings, to enable multimedia items to be pre-cached on the rendering devices.

5. The system of claim 1, wherein a second secure key exchange to occur to obtain the second key in response to the remaining portion of the protected multimedia item being progressively streamed from the controlling device.

6. A hybrid streaming method comprising:
    receiving portions of protected media items from a controlling device for pre-caching into a cache of a rendering device, wherein the cache is a pre-determined length and the portions of the protected media items being received from the controlling device using content protection technology;
    obtaining, prior to a user selecting a protected media item for playback, a first encryption key via a first secure key exchange, the first encryption key for decrypting the pre-cached portion of the protected media item;
    pre-caching the first encryption key for decrypting the portion of the protected media item into the cache of the rendering device;
    upon the user selecting the protected media item for playback: (i) expanding the cache, (ii) immediately decrypting, using the first encryption key, the pre-cached portion of the protected media item selected by the user, (iii) playing the decrypted portion of the selected protected media item from the cache in real-time for the user, (iv) simultaneously downloading remaining portions of the selected protected media item into the cache at a rate faster than real-time while the selected protected media item from the cache is playing, and (v) decrypting, using a second encryption key, the remaining portions of the selected protected media item; and upon the user requesting usage of a trick mode, performing one of: (i) allowing usage of the trick mode until a pre-determined amount of time before an end of the selected protected media item in the cache and (ii) allowing trick mode usage past the end of the selected protected media item in the cache and streaming the remaining portions of the selected protected media item from the controlling device in real-time.

7. The method of claim 6, wherein the controlling device connects to the rendering device to pre-cache the portions of the protected media items.

8. The method of claim 6, wherein the rendering device enables the user to browse media items on the controlling device prior to selecting the protected media item for playback.

9. The method of claim 6, wherein the download of the remaining portions of the selected protected media item begins as an offset that corresponds to an end location of the portions of the selected protected media item that were pre-cached.

10. The method of claim 6, further comprising receiving the remaining portions of the selected protected media item and appending the remaining portions of the selected protected media item to a corresponding file in the cache until the cache is full.

11. The method of claim 10, wherein the cache acts as a moving buffer, playing the selected protected media item from the cache in real-time while continuously filling the cache with the remaining portions of the selected protected media item faster than real-time.

12. The method of claim 11, wherein if an event occurs at the controlling device to slow or halt the download of the remaining portions of the selected protected media item resulting in a reduced cache, filling the cache at a faster speed when the event stops.

13. The method of claim 10, wherein the cache acts as a moving buffer, playing the remaining portions of the selected protected media item from the cache in real-time while continuously filling the cache with other remaining portions of the selected protected media item faster than real-time.

14. An article comprising: a non-transitory a storage medium having a plurality of machine accessible instructions, wherein when the instructions are executed by a processor, the instructions provide for:
receiving portions of protected media items from a controlling device for pre-caching into a cache of a rendering device, wherein the cache is a pre-determined length and the portions of the protected media items being received from the controlling device using content protection technology;
obtaining, prior to a user selecting a protected media item for playback, a first encryption key via a first secure key exchange, the first encryption key for decrypting the pre-cached portion of the protected media item;
pre-caching the first encryption key for decrypting the portion of the protected media item into the cache of the rendering device;
upon the user selecting the protected media item for playback: (i) expanding the cache, (ii) immediately decrypting, using the first encryption key, the pre-cached portion of the protected media item selected by the user, (iii) playing the decrypted portion of the selected protected media item from the cache in real-time for the user, (iv) simultaneously downloading remaining portions of the selected protected media item into the cache at a rate faster than real-time while the selected protected media item is playing, and (v) decrypting, using a second encryption key, the remaining portions of the selected protected media item; and upon the user requesting usage of a trick mode, performing one of: (i) allowing usage of the trick mode until a pre-determined amount of time before an end of the selected protected media item in the cache and (ii) allowing trick mode usage past the end of the selected protected media item in the cache and streaming the remaining portions of the selected protected media item from the controlling device in real-time.

15. The article of claim 14, wherein the controlling device connects to the rendering device to pre-cache the portions of the protected media items.

16. The article of claim 14, wherein the rendering device enables the user to browse media items on the controlling device prior to selecting the protected media item for playback.

17. The article of claim 14, wherein the download of the remaining portions of the selected protected media item begins at an offset that corresponds to an end location of the portions of the selected protected media item that were pre-cached.

18. The article of claim 14, further comprising instructions for receiving the remaining portions of the selected protected media item and appending the remaining portions of the selected protected media item to a corresponding file in the cache until the cache is full.

19. The article of claim 18, wherein the cache acts as a moving buffer, playing the selected protected media item from the cache in real-time while continuously filling the cache with the remaining portions of the selected protected media item faster than real-time.

20. The article of claim 19, wherein if an event occurs at the controlling device to slow or halt the download of the remaining portions of the selected protected media item resulting in a reduced cache, further comprising instructions for filling the cache at a faster speed when the event stops.

21. The article of claim 18, wherein the cache acts as a moving buffer, playing the remaining portions of the selected protected media item from the cache in real-time while continuously filling the cache with other remaining portions of the selected protected media item faster than real-time.

22. The method of claim 6, further comprising:
obtaining, through a second secure key exchange, the second encryption key for decrypting the remaining portions of the selected protected media item; and
caching and protecting the second encryption key for decrypting the remaining portions of the selected protected media item.

23. The article of claim 14, further comprising instructions for:
obtaining, through a second secure key exchange, the second encryption key for decrypting the remaining portions of the selected protected media item; and
caching and protecting the second encryption key for decrypting the remaining portions of the selected protected media item.

* * * * *